W. BLESSING.
Seed-Dropper.
No. 26,410. Patented Dec. 13, 1859.
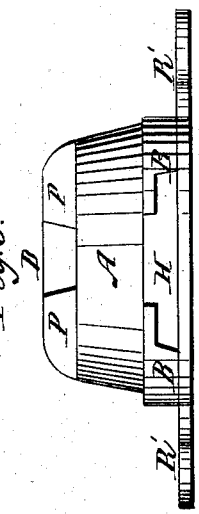
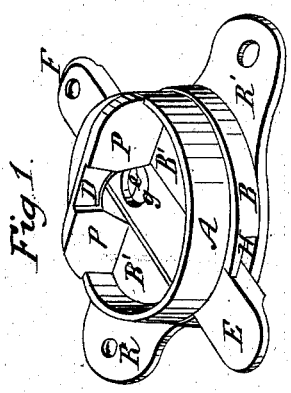
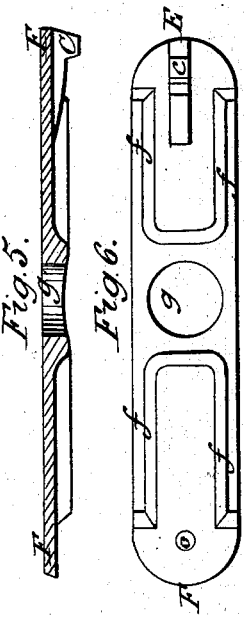
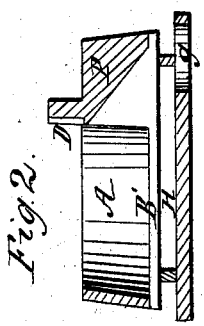
Witnesses
H. E. Clifton
C. J. Shipley
Inventor.
William Blessing.

UNITED STATES PATENT OFFICE.

WILLIAM BLESSING, OF JEFFERSONVILLE, OHIO.

IMPROVEMENT IN SEED-PLANTERS.

Specification forming part of Letters Patent No. 26,410, dated December 13, 1859.

*To all whom it may concern:*

Be it known that I, WILLIAM BLESSING, of Jeffersonville, in the county of Fayette and State of Ohio, have invented a new and useful Improvement in Distributers for Corn-Planters; and I do hereby declare that the following is a full and clear description thereof, reference being had to the accompanying drawings, and to the letters of reference marked thereon, and made to form a part of this specification.

The nature of the invention consists in the arrangement of the top part of the seed-distributer, having on its periphery or sides peculiar chaff-openings for removing chaff and other obstructions, more particularly described in the specification.

In reference to the accompanying drawings, Figure 1 is a perspective view of the distributing device. Fig. 2 is a vertical sectional view. Fig. 3 is a side elevation of the same. Fig. 4 represents end views of the feed-bar. Fig. 5 is a longitudinal vertical elevation of the feed-bar, and Fig. 6 is a bottom view of the feed-bar.

A represents the top portion of the distributer, cast in one piece with a base, B, and having a vertical partition, P, in which is formed a recess, D, for the brush, and also formed with transverse plates B' and projecting flanges R', by means of which the distributer may be secured upon the frame of the planter.

E F is a sliding feed-bar, the under side of which is formed with depressions between the flanges $f$, which serve to facilitate the escape of the chaff. $g$ is an aperture in the feed-bar for delivery of the corn.

C is a lug formed upon the feed-bar, and serves to prevent it from sliding from its proper position in the distributer when the planter is in operation.

H is a chaff-chamber formed in the distributer, and serves to receive the chaff as it comes through the aperture $g$ of the feed-bar, and thereby to prevent the clogging or choking of the seeding device.

By means of the peculiar construction of the feed-bar, as clearly shown in Fig. 6, in combination with the chaff-chamber H, the chaff among the corn is permitted free escape and the seeding device prevented from choking, as before described.

The within-described distributer may be operated in a manner precisely similar to distributers in common use.

What I claim as my invention, and desire to secure by Letters Patent, is—

The arrangement of the top portion of the distributer, made with a semi-annular opening, and the recess under the covered portion of the said top, when the periphery of the said top is made with the chaff-openings H on either side of the reciprocating seed-bar, so that the said bar, by its reciprocating action, shall work out the chaff through the passages H H on either side of the seed-bar, and thus prevent choking the distributer.

In testimony of which invention I have hereunto set my hand in presence of witnesses.

WILLIAM BLESSING.

Witnesses:
H. E. CLIFTON,
C. J. SHIPLEY.